Aug. 17, 1926. 1,596,334
R. C. BULLOCK
COTTON CHOPPER AND CULTIVATOR
Filed March 17, 1925
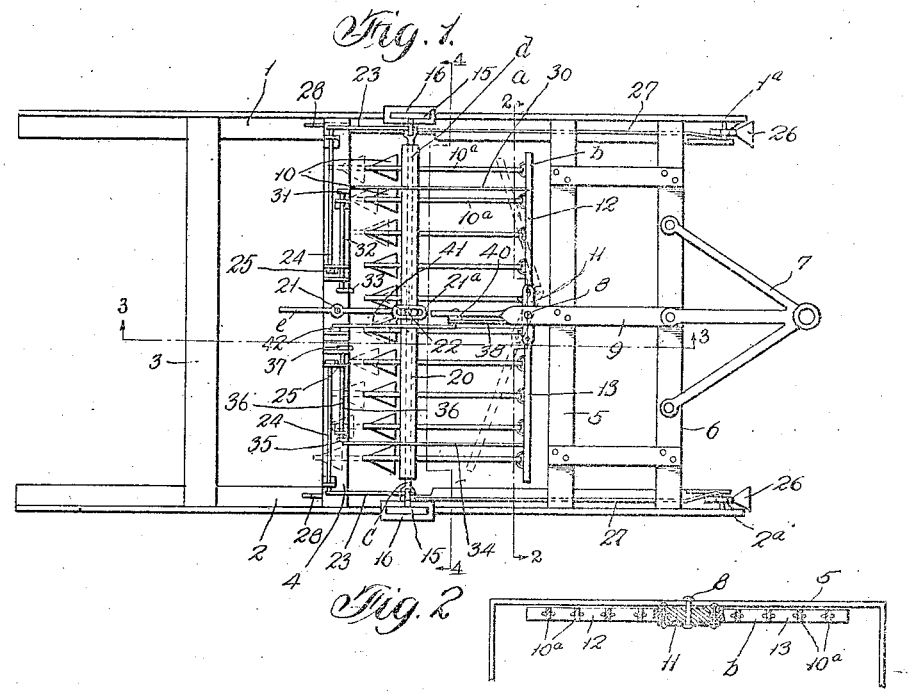
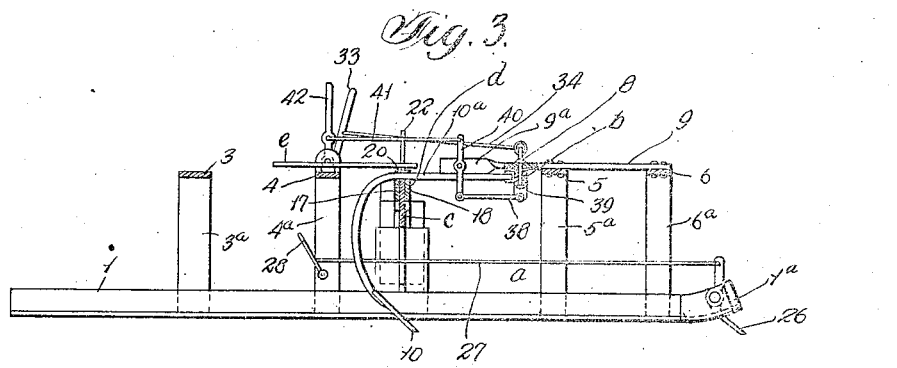
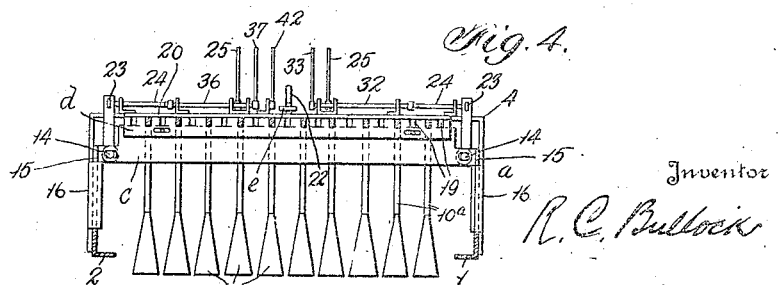
Inventor
R. C. Bullock
By Robert Walton
Attorney Patented Aug. 17, 1926.

1,596,334

UNITED STATES PATENT OFFICE.

ROBERT C. BULLOCK, OF STEM, NORTH CAROLINA.

COTTON CHOPPER AND CULTIVATOR.

Application filed March 17, 1925. Serial No. 16,252.

This invention relates to a combined cotton chopper and cultivator. The invention comprises a pair of connected skids, a traction bar extending transversely of the frame of the machine and to which the hoes or cultivators are attached, and this bar is composed of sections which are adjustable so as to keep the hoes in alinement with one another, for cotton chopping, or to set the hoes out of alinement with one another, for cultivating. The invention also includes means for raising and lowering the hoes with respect to the ground and to the skids, and for permitting the latter to tilt laterally with respect to the hoe-supporting means so that the hoes may work at an even depth on flat ground while one of the skids may be moving on lower ground as when operating along the edges of terraces.

In the accompanying drawing,

Fig. 1 is a top plan view of the chopper and cultivator;

Fig. 2 is a section on the line 2—2 of Fig. 1;

Fig. 3 is a section on the line 3—3 of Fig. 1; and,

Fig. 4 is a section on the line 4—4 of Fig. 1.

Referring to the drawing, $a$ represents the frame of the implement, comprising a pair of skids 1 and 2, connected together and held parallel with one another by cross-pieces 3, 4, 5 and 6. These cross-pieces consist of metal bars having their end portions $3^a$, $4^a$, $5^a$ and $6^a$ turned downwardly and secured to the skids, the main portions of the cross-pieces being thus supported in horizontal planes at some distance above the skids. The forward ends $1^a$ and $2^a$ of the skids are turned upwardly, as shown, and a draft connection 7 is secured to the cross-piece 6, whereby the implement may be pulled by horse or tractor.

A traction bar $b$ is connected by a pivot 8 to a bar 9 which is secured to the cross-pieces 5 and 6 and projects to the rear of the bar 5, and the shanks $10^a$ of a plurality of hoes or choppers 10 are pivotally connected to the traction bar. The traction bar comprises a short central section 11 and two end sections 12 and 13, which are pivotally connected to the ends of the central section. By means, hereinafter to be described, the sections may be arranged at angles to one another, as indicated in dotted lines in Fig. 1.

The shanks of the hoes extend rearwardly from the traction bar over a vertically movable supporting bar $c$, and thence downwardly, at the rear of said latter bar to the hoes, as shown in the drawing. The supporting bar $c$ is connected at its ends by pivots 14 to slides 15 which are movable vertically in guideways 16, secured to the skids. The shanks of the hoes rest directly upon the supporting bar, which is in the form of a flat plate, and they are spaced from one another and held in sliding engagement with the upper edge of the bar by a slide $d$, composed of two plates 17 and 18, engaging the sides of the bar $c$ and having a series of notches 19 for receiving the shanks of the hoes, and a cap plate 20 which extends along the upper edges of the plates 17 and 18 and connects them together and closes the upper ends of these notches. It will be evident that if the slide $d$ is moved in one direction or the other, the hoes will be moved transversely of the implement. For moving the slide $d$, when desired, a lever $e$ is provided. As shown, this lever is pivoted at 21 to the center of the cross-bar 4 and has a slotted end $21^a$ engaging a pin 22 on the slide, whereby when the lever is moved about its pivotal point the slide and hoes will be moved laterally.

For raising and lowering the hoes, I provide arms 23 which are pivotally connected to the ends of the supporting bar $c$, and these arms are secured to shafts 24, which are journaled in suitable bearings on the cross-bar 4 and provided with hand levers 25. These levers are movable independently and by actuating the levers the supporting bar $c$ and the hoes may be raised or lowered bodily with respect to the skids and the ground; or the supporting bar may be tilted with respect to the frame, to a certain extent, as may be desirable, when one of the skids is passing over ground lower than the hoes, when the latter are in engagement with the ground.

Hoes 26 are pivotally connected to the forward ends of the skids, and these may be raised or lowered, when desired, by suitable means such as cables 27 extending rearwardly and operable by hand levers 28.

When the machine is in use as a cotton chopper, it is drawn crosswise of the rows of cotton plants and the hoes or choppers cut out the plants from the parts of the rows, leaving the plants in the short spaces between the hoes. After the machine or implement has been drawn across the field, it is reversed and drawn backward, one of the skids tracking in the path which the hoe thereon made in previously crossing the field. When obstacles are met with the supporting bar c may be moved bodily upward to avoid the obstacles, and in places where the ground is terraced, if one of the skids travels on ground lower than the other, the supporting bar may be tilted so that it will be parallel with the ground being cultivated while the skid is on lower ground.

The purpose of making the traction bar b in several sections is to provide means for throwing the hoes out of line with one another, so that the machine can be used as a cultivator. As shown, the section 12 of the traction bar is connected by a rod 30 to a crank arm 31 on a shaft 32, which is journaled on the cross-piece 4 and provided with a handle 33. Similarly, the section 13 of the traction bar is connected by a rod 34 to a crank arm 35 on a shaft 36 which is journaled on the cross-piece 4 and provided with a hand lever 37. By operating the levers 33 and 37, the sections 12 and 13 of the traction bar may be swung rearwardly or forwardly about their pivotal points, to move the hoes connected therewith out of or into line with one another. The central portion 11 of the traction bar is movable about its pivotal point by means of a link 38 connected to a projection 39 on the underside of said section and to a lever 40, which is pivoted to the rear end 9ª of the bar 9. This lever 40 is connected by a link 41 to a hand lever 42, arranged on the bar 4 convenient to the operator. The shanks of the two central hoes are connected to the section 11. In setting the hoes to use the machine as a cultivator, the section 11 is turned out of the position shown in full lines in the drawing, where it is at right angles to the skids, to the dotted line position, and this sets one of the hoes connected to said section in advance of the other. The sections 12 and 13 are then moved backwardly and the hoes connected with these sections are set one in advance of the other, as shown in dotted lines. When it is desired to again use the machine as a cotton chopper, the several sections of the traction bar will again be brought into alinement with one another, as shown in full lines in the drawing. When a machine is in use as a cotton chopper or a cultivator, if it is desired to change the position of the hoes laterally with respect to the skids, the lever e may be swung to the right or to the left and this will move the guide bar d to adjust the hoes laterally.

What I claim is:

1. In an implement of the class described, a pair of parallel skids, a traction bar and a supporting bar extending transversely of the skids at the rear of the traction bar, a plurality of hoes having shanks pivotally connected to the traction bar and resting upon the supporting bar, a slide upon the supporting bar and having spaced openings through which the shanks extend, means for raising and lowering the supporting bar and means for moving said slide along the supporting bar.

2. In an implement of the class described, a pair of parallel skids, a traction bar and a supporting bar extending transversely of the skids at the rear of the traction bar, said traction bar composed of several sections, a plurality of hoes having shanks pivotally connected to the traction bar and resting upon the supporting bar, a slide adjustable along the supporting bar, and having spaced openings through which the shanks extend, means for raising and lowering the supporting bar, and means for setting the sections of the traction bar at various angles to one another.

3. In an implement of the class described, a pair of parallel skids, a traction bar and a supporting bar extending transversely of the skids at the rear of the traction bar, upright guides on the skids, slides movable in said guides and connected to the supporting bar, means for tilting the supporting bar with respect to the skids, and a plurality of hoes having shanks connected to the traction bar and resting upon the supporting bar.

In testimony whereof I hereunto affix my signature.

ROBERT C. BULLOCK.